March 21, 1944. W. R. GRISWOLD 2,344,864
AIR CONDITIONED VEHICLE
Filed Feb. 14, 1941

INVENTOR.
Walter R. Griswold
Attorneys

Patented Mar. 21, 1944

2,344,864

UNITED STATES PATENT OFFICE 2,344,864

AIR CONDITIONED VEHICLE

Walter R. Griswold, Detroit, Mich., assignor to Packard Motor Car Company, Detroit, Mich., a corporation of Michigan Application February 14, 1941, Serial No. 378,880

2 Claims. (Cl. 62—117)

This invention relates to air-conditioning mechanism and more particularly to such mechanism in use with motor vehicle bodies.

At the present time motor vehicles are equipped with mechanism for reducing the temperature of the air in the bodies. Such cooling mechanism consists usually of a compressor, condenser and heat transfer unit connected in a circuit containing a suitable refrigerant, such as sulphur dioxide. Air is moved past the cooling unit by some form of fan driven by an electric motor under the control of a switch at the vehicle instrument board. As the fan is the motive power for moving air past the cooling unit, the motor control switch position determines whether the cooling system is effective or ineffective. The compressor is connected to be driven by the vehicle engine so that it is operated whenever the engine is operating regardless of whether the cooling unit is effective or ineffective.

It is an object of this invention to provide a control for the compressor drive mechanism in a cooling system of the type referred to.

Another object of the invention is to provide a motor vehicle body air-cooling apparatus with a control that renders the compressor drive mechanism effective or ineffective in accordance with temperature conditions within the body.

Another object of the invention is to provide a clutch mechanism for the compressor of a vehicle body cooling system that can be rendered effective or ineffective either manually or automatically.

A further object of the invention is to provide electrical control means responsive to thermostatic or manual regulation for rendering an air-cooling system effective or ineffective.

Other objects of the invention will appear from the following description taken in connection with the drawing, which forms a part of this specification, and in which.

Figures 1, 2, 3:
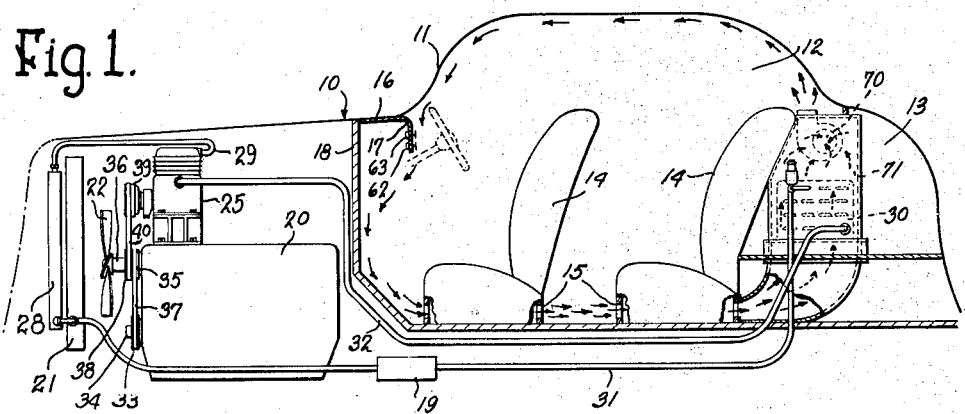
Fig. 1 is a side view of a motor vehicle equipped with the cooling system as described in this application.
Fig. 2 is a sectional view of a portion of the drive mechanism for the compressor in the cooling system.
Fig. 3 is a diagrammatic view of the control for the compressor drive mechanism.

The invention is shown assembled with a conventional motor vehicle 10 having a closed body 11 in which there is the usual passenger compartment 12 and rear storage compartment 13. Seats 14 are arranged in the passenger compartment and are formed with air passages 15 through the base portions thereof. The body also has the usual cowl 16, instrument board 17, and dash 18. The engine 20 for driving the vehicle can be of the conventional type and has the usual radiator 21 and fan 22.

Mounted on the vehicle is a cooling system for the air in the passenger compartment which can be rendered effective or ineffective. The system illustrated is a well-known closed circuit, compressor-condenser-evaporator type in which a suitable cooling agent, such as sulphur dioxide, is used. The compressor 25 is bolted on top of the forward end of the vehicle engine and the actuator shaft 26 thereof projects forwardly of the engine so that it can be operated by driving mechanism powered by the engine. The condenser 28 is arranged forwardly of the radiator and is connected with the compressor by conduit 29. The evaporator 30 is placed in the body storage compartment and is connected with the condenser by conduit 31 and with the compressor by conduit 32, a liquid refrigerant storage tank 19 being interposed in conduit 31.

The driving mechanism for operating the compressor can consist of the drive for the engine fan and a connection from the fan driving mechanism to the shaft 26. A pulley 33 is fixed to the forward end of the engine crankshaft 34 and another pulley 35 is fixed to shaft 36 on which the fan is mounted and a suitable driving belt 37 engages such pulleys. A power transmitting pulley 38 is also fixed to the fan shaft in line with a pulley 39 mounted at the forward end of the compressor shaft and such pulleys are drivingly connected by suitable means, such as belt 40. Between pulley 39 and shaft 26 is a driving connection that can be engaged or disengaged, such connection being in the form of a friction clutch comprising clutch face 41 formed on the rear end of pulley 39 and a disk 42 having clutch face 43. The clutch disk is keyed to shaft 26 and its face 42 is adapted to be engaged by the face 41 on the pulley. Pulley 39 is rotatably mounted on roller bearings 44 that ride on a ring member 45 that has a sliding fit on the hub portion of disk 42. The disk and ring members are retained from axial displacement by washer 46 and nut 47 screwed on the forward end of the compressor shaft. The clutch can be arranged to run in oil and cover 80 encloses the forward end of pulley 39 and another cover 81 is secured to the rear of pulley 39 and carries a seal 82 that bears against the compressor casing extension 60.

The clutch faces 41 and 43 are normally disengaged by a coil spring 48 seated against clutch disk 42 and a bearing ring member 49 engaging the rear face of the hub of pulley 39, such ring member having legs 51 extending into slots 52 in the member 45. The clutch elements are preferably engaged electromagnetically by means of a circuit 53 connected with the vehicle ignition system beyond the ignition switch 54 and battery 55. The circuit also includes a grounded winding 56 arranged in a recess in the front face of magnet disk 42. The disk has a rearwardly extending flange 57 on which is mounted an insulator ring seat 58 carrying a contact ring 59. The winding connects with ring 59 and a suitable brush 157 in the casing extension 60 engages the ring. This brush is connected to the wiring 61 leading from the ignition circuit.

The magnetic clutch is energized to engage clutch faces 41 and 43 and establish the drive from the fan shaft to the compressor shaft when the engine is operating. In the magnetic circuit is arranged a control in the form of a switch 62 conveniently located on the instrument board for operation by the driver of the vehicle. Another switch 63 is arranged in the magnetic circuit and is responsive to temperature in the body passenger compartment. Such thermostatically controlled switch can be of any conventional design and located at the instrument board. Either one or both of such switches may be employed in the circuit and when both switches are employed they are arranged in series, the manually operable switch being nearest to the ignition switch. It will be obvious that current will not flow to the magnet winding when either ignition switch 54 or manually operable switch 62 is open. Likewise when such switches are closed the thermostatic switch 63 will open and close in accordance with temperature conditions in the passenger compartment to thereby deenergize and energize the magnet winding. When the temperature rises above a predetermined degree the magnet will be automatically energized and will draw the pulley 39 into driving engagement with disk 42 so that the compressor will be operated. When any one of the switches is open the magnetic driving connection will be broken and spring 48 will push the pulley 39 forwardly away from disk 42 thus disconnecting the drive to the compressor so that the refrigerating system is ineffective to cool the air.

Air in the body passenger compartment is circulated by a motor driven blower 70 arranged at the outlet end of a chamber 71 in the storage compartment behind the rear seat. The evaporator of the refrigeration system is also located in chamber 71 and air is pulled into the chamber from the passenger compartment beneath the rear seat. The path of the air circulation is shown by arrows in Fig. 1.

With the control arrangement herein described the cooling system will absorb heat from air in the passenger compartment only as desired or required and the cooling system will operate only when cooling is required to maintain a predetermined air temperature in the vehicle body.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a vehicle having a closed type body, a compressor - condenser - evaporator refrigerating system for cooling the air in the body, an engine for driving the vehicle, a driving connection from the engine to the compressor including a magnetic clutch, an engine ignition circuit having a battery and an ignition switch, a branch circuit leading from the ignition circuit beyond the ignition switch to the magnetic clutch, and a switch in the branch circuit operable in response to the temperature of air in the body, said temperature responsive switch being in series with the ignition switch.

2. In a vehicle having a closed type body, a compressor - condenser - evaporator refrigerating system for cooling the air in the body, an engine for driving the vehicle, a driving connection from the engine to the compressor including a magnetic clutch, an engine ignition circuit having a battery and an ignition control switch, a branch circuit leading from the ignition circuit beyond the ignition switch, a switch in the branch circuit, means operative above a predetermined temperature in the body for closing said branch circuit switch, and a manually operable switch in the branch circuit between the temperature operated switch and the ignition switch, said branch circuit switches being in series with each other and with the ignition switch.

WALTER R. GRISWOLD.